United States Patent
Aghagolzadeh et al.

(10) Patent No.: US 9,558,532 B2
(45) Date of Patent: Jan. 31, 2017

(54) JAGGED EDGE REDUCTION USING KERNEL REGRESSION

(71) Applicant: Sharp Laboratories of America, Inc., Camas, WA (US)

(72) Inventors: Mohammad Aghagolzadeh, East Lansing, MI (US); Christopher A. Segall, Vancouver, WA (US)

(73) Assignee: SHARP LABORATORIES OF AMERICA, INC., Camas, WA (US)

( * ) Notice: Subject to any disclaimer, the term of this patent is extended or adjusted under 35 U.S.C. 154(b) by 0 days.

(21) Appl. No.: 14/738,613

(22) Filed: Jun. 12, 2015

(65) Prior Publication Data
US 2015/0356707 A1    Dec. 10, 2015

Related U.S. Application Data

(62) Division of application No. 13/690,783, filed on Nov. 30, 2012, now Pat. No. 9,076,229.

(51) Int. Cl.
*G06K 9/32* (2006.01)
*G06T 3/40* (2006.01)
*G06T 5/00* (2006.01)

(52) U.S. Cl.
CPC ............ *G06T 3/40* (2013.01); *G06T 3/403* (2013.01); *G06T 5/003* (2013.01); *G06T 2207/10004* (2013.01); *G06T 2207/10024* (2013.01); *G06T 2207/20016* (2013.01); *G06T 2207/20024* (2013.01); *G06T 2207/20192* (2013.01)

(58) Field of Classification Search
CPC ............ G06K 9/40; G06K 9/44; G06K 9/32; G06T 2207/20012; G06T 2207/10004; G06T 2207/2004; G06T 2207/10024; G06T 2207/20016; G06T 2207/20028; G06T 2207/20192; G06T 2207/20204
USPC ......................................................... 382/299
See application file for complete search history.

(56) References Cited

U.S. PATENT DOCUMENTS

| | | | | |
|---|---|---|---|---|
| 8,675,999 | B1 * | 3/2014 | Liang | G06T 3/4053 |
| | | | | 382/299 |
| 2005/0025383 | A1 * | 2/2005 | Domingo | G06T 5/002 |
| | | | | 382/266 |
| 2007/0047838 | A1 * | 3/2007 | Milanfar | G06K 9/40 |
| | | | | 382/289 |
| 2009/0161990 | A1 | 6/2009 | Tonisson | |
| 2011/0243429 | A1 | 10/2011 | Yao | |

(Continued)

OTHER PUBLICATIONS

Takeda, Hiroyuki et al.; Kernel Regression for Image Processing and Reconstruction; IEEE Transactions on Image Processing, vol. 16, No. 2; Feb. 2007; 18 pages.

*Primary Examiner* — Ali Bayat
(74) *Attorney, Agent, or Firm* — Schwabe Williamson & Wyatt, PC

(57) ABSTRACT

An image decoder includes a base layer to decode at least a portion of an encoded video stream into a first image having a first image format. The image decoder can generate a color space prediction by scaling a color space of the first image from the first image format into a color space corresponding to a second image format. The image decoder includes an enhancement layer to decode the encoded video stream to generate a second image in the second image format based, at least in part, on the color space prediction.

15 Claims, 9 Drawing Sheets

(56) References Cited

U.S. PATENT DOCUMENTS

| | | | | |
|---|---|---|---|---|
| 2012/0327227 A1* | 12/2012 | Ikeda | ................. | G01M 3/38 |
| | | | | 348/143 |
| 2013/0084027 A1* | 4/2013 | Koga | ................. | G06T 3/4053 |
| | | | | 382/299 |
| 2013/0100286 A1* | 4/2013 | Lao | ................. | G06K 9/00785 |
| | | | | 348/148 |
| 2014/0280316 A1* | 9/2014 | Ganick | ............ | G06F 17/30522 |
| | | | | 707/769 |

* cited by examiner

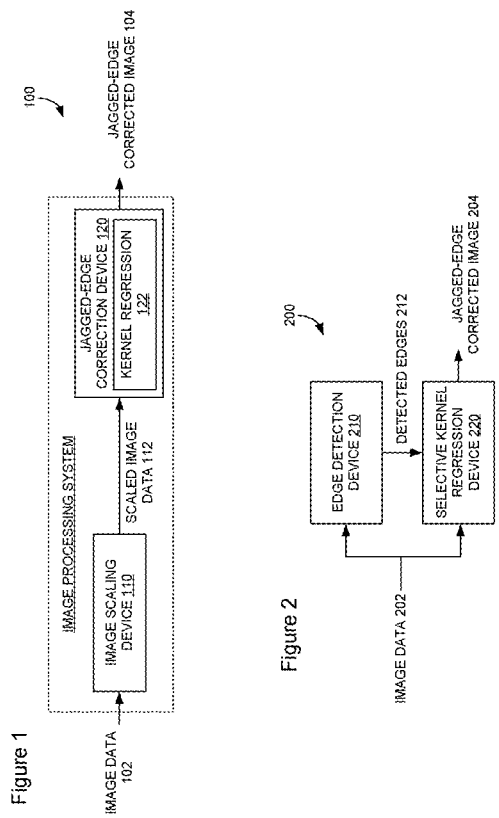

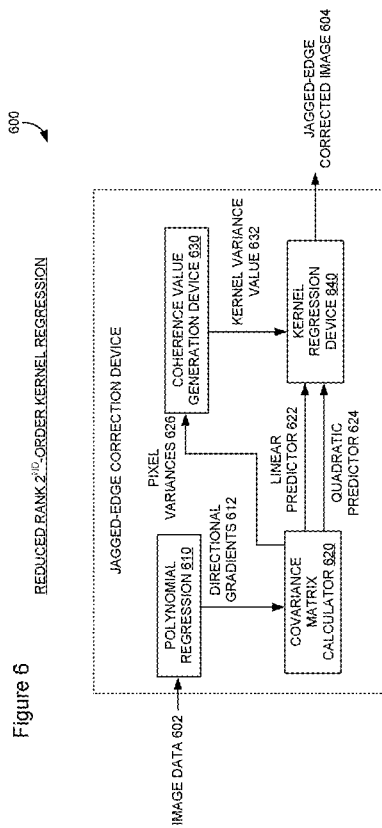
Figure 6    REDUCED RANK 2ⁿᵈ-ORDER KERNEL REGRESSION

JAGGED EDGE REDUCTION USING KERNEL REGRESSION

RELATED APPLICATION

This is a divisional of application Ser. No. 13/690,783, filed Nov. 30, 2012.

TECHNICAL FIELD

This disclosure relates generally to image processing, and, more particularly, to jagged edge reduction using kernel regression.

BACKGROUND

Many imaging systems can upscale a resolution of an image, i.e., generate a higher resolution image from a lower resolution image. Since upscaling can introduce artifacts, such as jagged edges, into the upscaled image, some of these imaging systems can process the image after upscaling, for example, with level set motion, anisotropic diffusion, total variation minimization, morphological antialiasing, or kernel regression, in an attempt to remove or reduce the jagged edges. While these techniques can remove or reduce the jagged edges introduced by the upscaling, they also cause the imaging system to smooth other portions of the upscaled image, leaving the overall image soft or washed out.

DESCRIPTION OF THE DRAWINGS

FIG. 1 is a block diagram example of an image processing system with a jagged-edge correction device.

FIG. 2 is a block diagram example of a jagged-edge correction device shown in FIG. 1.

FIG. 6 is a block diagram another example of the jagged-edge correction device shown in FIG. 1.

DETAILED DESCRIPTION

Figure 3:
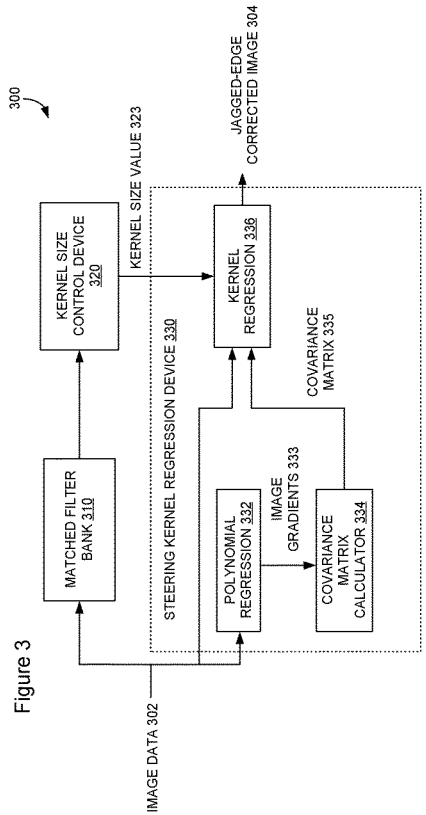
FIG. 3 is a block diagram another example of a jagged-edge correction device in FIG. 1.

FIG. 1 is a block diagram example of an image processing system 100 with a jagged-edge correction device 120. Referring to FIG. 1, the image processing system 100 can include an image scaling device 110 to perform scaling operations on image data 102. In some embodiments, the image scaling device 110 can alter the resolution of the image data 102, for example, increasing the resolution in an upscaling operation, to generate scaled image data 112. During the upscaling operation, the increase of the image resolution can cause edges in the upscaled image to become jagged, such as having a stair-stepped appearance when the original image had a smooth-lined edge.

The image processing system 100 can include a jagged-edge correction device 120 to process in the scaled image data 112 to remove or reduce jagged edges from the scaled image data 112, and output a jagged-edge corrected image 104. In some embodiments, the jagged-edge correction device 120 can utilize kernel regression 122 over selected portions of the scaled image data 112 in an attempt to smooth the jagged edges in the image without altering at least some of the other portions of the image. For example, the jagged-edge correction device 120 can detect a location of edges or a presence of a jagged edge in the upscaled image, and utilize kernel regression 122 to smooth the detected edges, while leaving other portions of the upscaled image unprocessed by the kernel regression 122.

The kernel regression 122 can determine windows or kernels, each centered around a target pixel, within an image, and regressively average the pixels falling within each window or kernel to determine a new luminance and/or chrominance value for the corresponding target pixel. During the regressive averaging of the pixel falling within each window or kernel, the kernel regression 122 can apply a regressive weighting to the various pixels in the window or kernel, for example, based on one or more covariates, also known as predictor variables, explanatory variables, or independent variables. In some embodiments, the jagged-edge correction device 120 can modify the kernel regression 122 processing to adapt both the averaging of the pixel values within the kernel as well as the size and the shape of the kernel based on the content of the scaled image data 112 to remove or reduce jagged edges from the scaled image data 112. Embodiments of kernel regression and jagged-edge correction will be described below in greater detail.

FIG. 2 is a block diagram example of a jagged-edge correction device 200. Referring to FIG. 2, the jagged-edge correction device 200 can include an edge detection device 210, such as a Canny edge detector, to detect locations of edges in image data 202. In some embodiments, the edge detection device 210 can dilate the edges, for example, by one or more pixels in at least one direction around the detected edges, to incorporate pixels adjacent to the detected edges.

The jagged-edge correction device 200 can include a selective kernel regression device 220 to receive the detected edges 212 from the edge detection device 210 and to perform kernel regression within regions corresponding to those detected edges 212, while leaving the other portions of the image unprocessed by the kernel regression. In some embodiments, the selective kernel regression device 220 can receive undilated detected edges 212 from the edge detection device 210 and dilate them prior to performing kernel regression. The selective kernel regression device 220 can output a jagged-edge corrected image 204 having undergone the selective kernel regression within regions corresponding to the detected edges 212.

FIG. 3 is a block diagram another example of a jagged-edge correction device 300. Referring to FIG. 3, the jagged-edge correction device 300 can include a matched filter bank 310 to compare image data 302 against known jagged edge configurations. For example, the matched filter bank 310 can include multiple matched filters, each configured to compare the image data 302 against a different jagged edge configuration. In some embodiments, each matched filter can output a score corresponding to whether match to a known jagged edge was made or how close each matched filter came to finding a match to the corresponding jagged edge configuration. The matched filter bank 310 can determine a composite score for jaggedness in the image data 302, for example, by selecting a maximum score out of the scores from the various matched filters or by aggregating the scores from the various matched filters.

The kernel size control device 320 can generate a kernel size value 323 based on the composite score from the matched filter bank 310. In some embodiments, the kernel size value 323 can be a scalar value corresponding to a size of a kernel or window to be utilized by a steering kernel regression device 330.

The steering kernel regression device 330 can perform steering kernel regression on the image data 302 to smooth edges in the corresponding image. The steering kernel regression device 330 can include a polynomial regression element 332 to generate image gradients 333 from the image data 302. The image gradients 333 can correspond to a directional change of an intensity or color in the image represented by the image data 302. The polynomial regression element 332 can perform a polynomial regression on the image data 302 to determine the image gradients 333 based on Equation 1:

$$f(x_0 + x, y_0 + y) =$$

$$f(x_0, y_0) + xf_x + yf_y + \frac{x^2}{2}f_{xx} + \frac{y^2}{2}f_{yy} + xyf_{xy} + e =$$

$$\alpha_{00} + x\alpha_{10} + y\alpha_{01} + x^2\alpha_{20} + x^2\alpha_{02} + xy\alpha_{11} + e$$

Equation 1

The function corresponds to a two-dimensional, x-direction and y-direction, polynomial regression. The "x-direction" and "y-direction" can correspond to dimensions of the image, while x and y can be variables corresponding to locations within the image in the x-direction and y-direction, respectively. $\alpha_{00}$ can be an image gradient 333 corresponding to $f(x_0, y_0)$, $\alpha_{10}$ can be an image gradient 333 corresponding to $f_x$, $\alpha_{01}$ can be an image gradient 333 corresponding to $f_y$, $\alpha_{20}$ can be an image gradient 333 corresponding to $f_{xx}$, $\alpha_{02}$ can be an image gradient 333 corresponding to $f_{yy}$, and $\alpha_{11}$ can be an image gradient 333 corresponding to $f_{xy}$. The function $f_x$ can be a derivative with respect to x of function $f(x,y)$, $f_y$ can be a derivative with respect to y of function $f(x,y)$, $f_{xy}$ can be a derivative with respect to x and y of function $f(x,y)$, $f_{xx}$ can be a second derivative with respect to x of function $f(x,y)$, and $f_{yy}$ can be a second derivative with respect to y of function $f(x,y)$. The function can include covariates x, y, xy, $x^2$, and $y^2$, which will be described below in greater detail. The e can be an error value.

The steering kernel regression device 330 can include a covariance matrix calculator 334 to generate a covariance matrix 335, for example, a 2×2 covariance or structure matrix from the image gradients 333. The 2×2 covariance or structure matrix can identify the covariates and gradients for the steering kernel regression device 330 to utilize in performing kernel regression 336 on the image data 302. Embodiments of the kernel regression 336 with the covariance matrix 335 and the kernel size values 323 will be described below in greater detail.

Figure 4A:
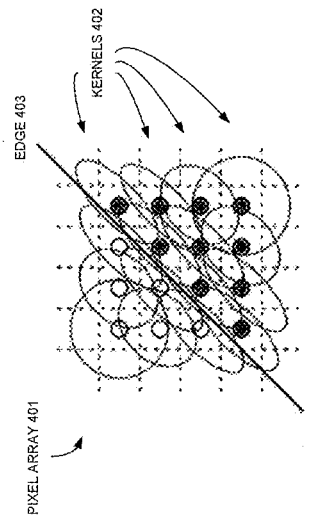
FIG. 4A is a graph example of the kernel regression shown in FIGS. 2 and 3.

FIG. 4A is a graph example of the kernel regression shown in FIGS. 2 and 3. Referring to FIGS. 3 and 4A, the graph shows a pixel array 401 having image content differences represented by a black or white color of the pixels in the pixel array 401. For example, a transition between the black and white pixels in the pixel array 401 can form an edge 403 in an image represented by the pixel array 401. The kernels 402 can surround each pixel in the pixel array 401.

Since, in some embodiments, the kernels 402 can be varied in size and shape based on the content of the pixels, the regression performed on the image data 302 in the pixel array 401 is known as steering kernel regression. In some embodiments, the steering kernel regression device 330 can control a size of the kernels 402 based on the kernel size value 323 from the kernel size control device 320. The kernel size value 323 can be a scalar value that can expand the kernels 402, for example, to cover multiple pixels, or contract the size of the kernels 402, for example, down to a single pixel. The kernel regression 336 can regressively average the pixel data within each of the kernels 402 based on the covariances represented in the covariance matrix 335, which can indicate a weighting to provide each pixel within the kernels 402. Embodiments of the covariances utilized in the kernel regression will be described below.

Figure 4B:
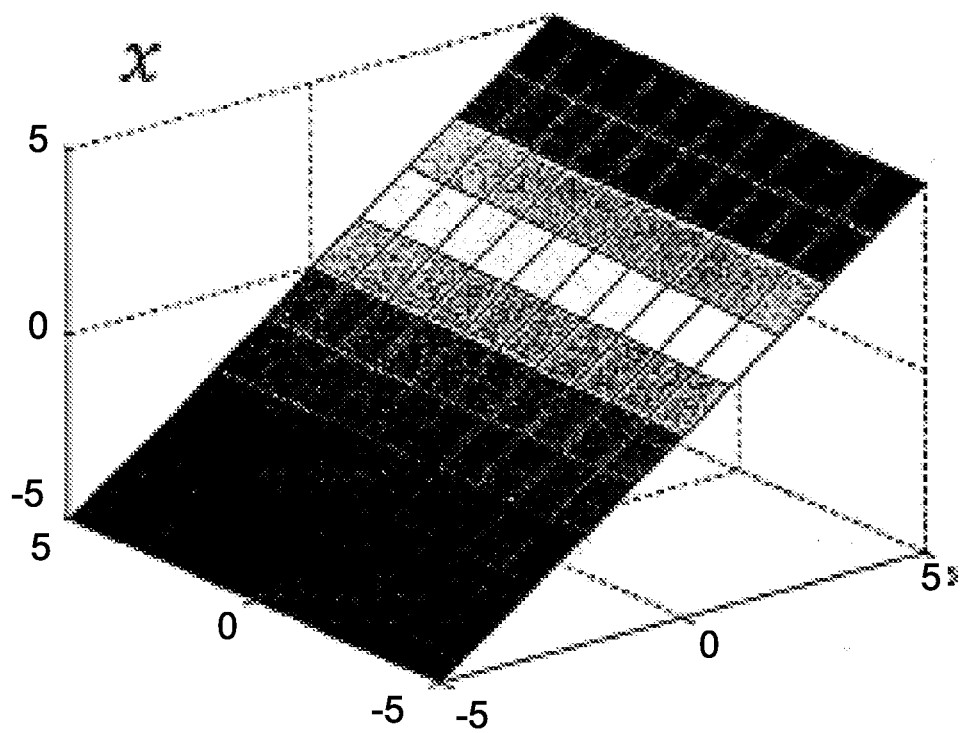
FIG. 4B-4F are graphs showing various covariates utilized by the kernel regression shown in FIGS. 2 and 3.
Figure 4C:
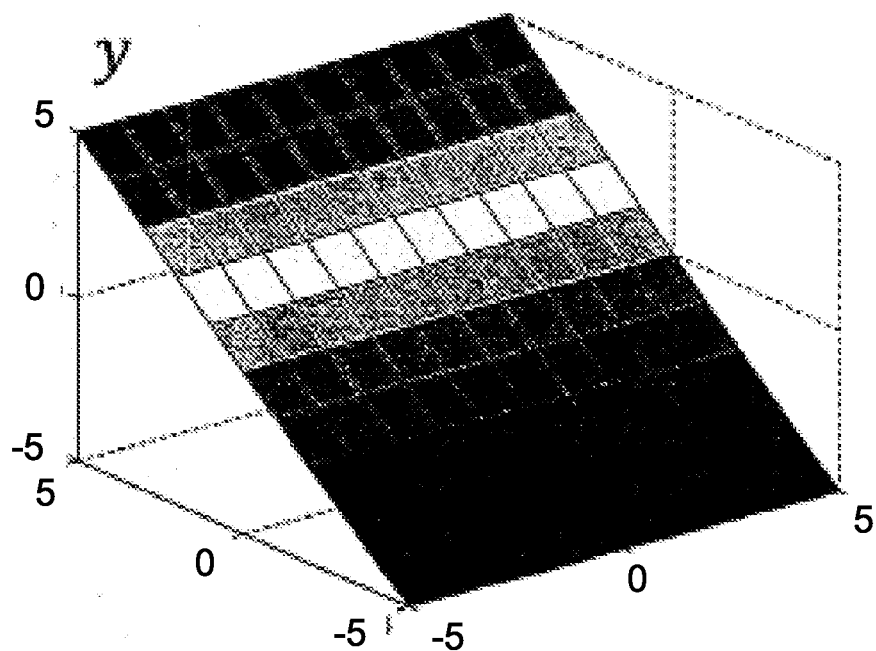
Figure 4D:
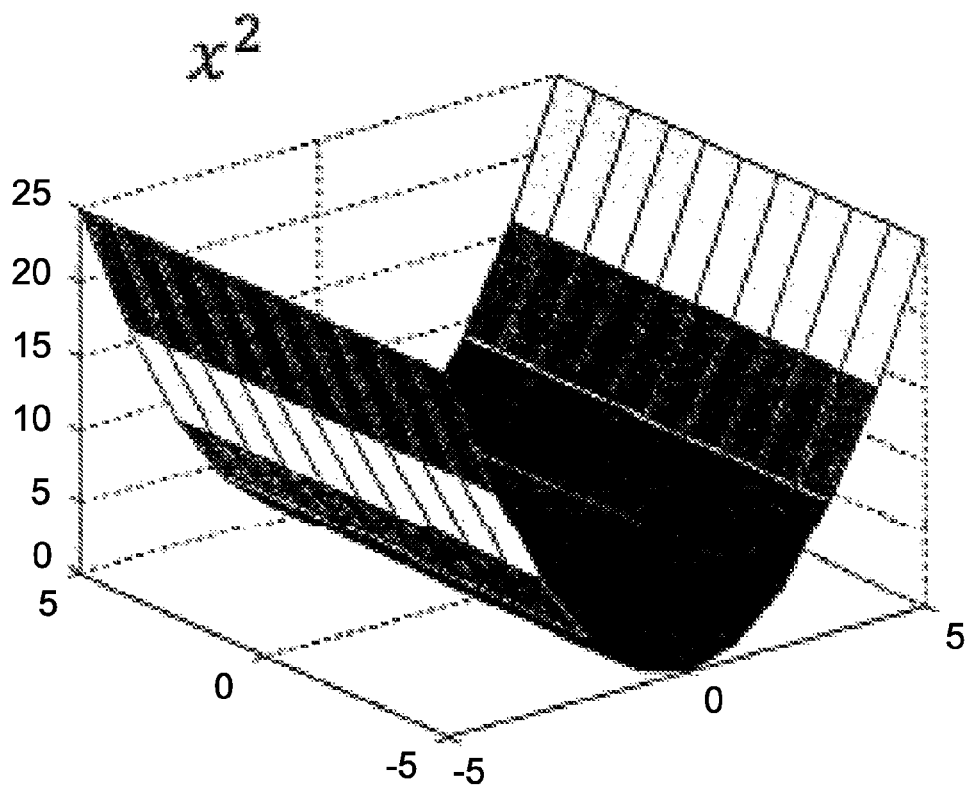
Figure 4E:
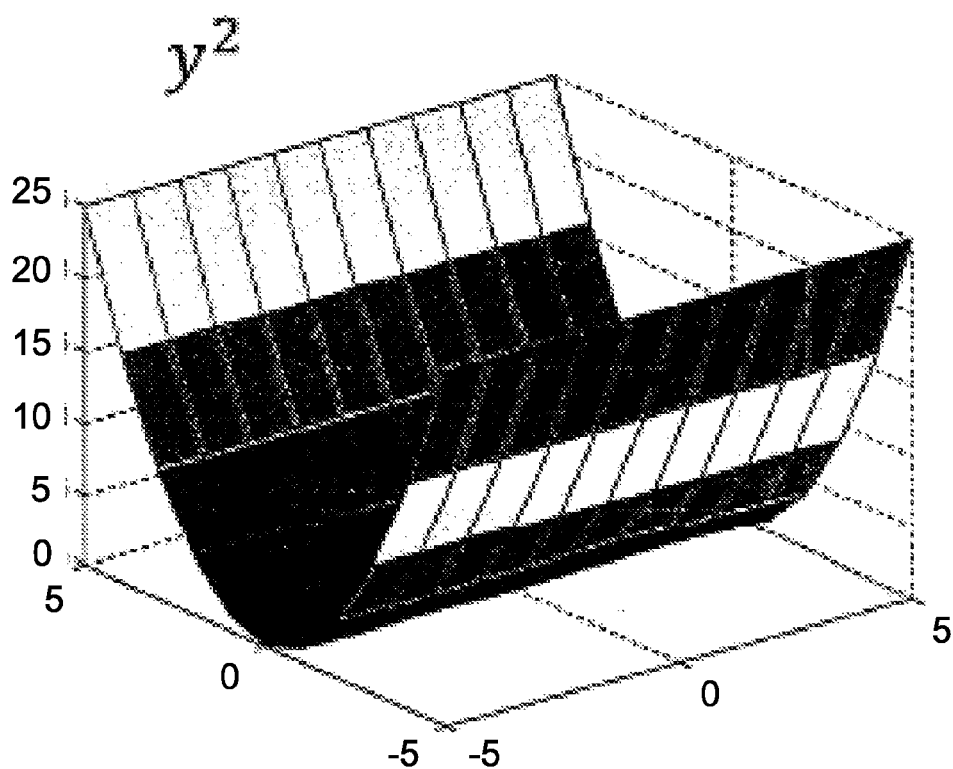
Figure 4F:
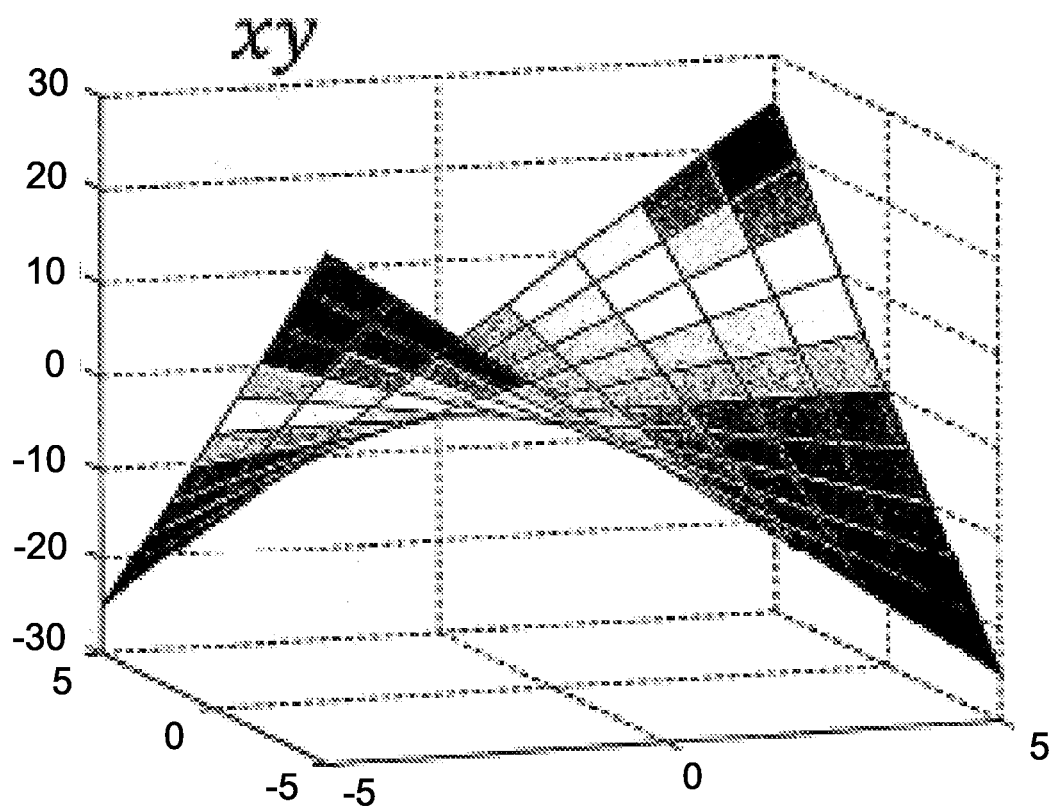

FIG. 4B-4F are graphs showing various covariates utilized by the kernel regression shown in FIGS. 2 and 3. Referring to FIGS. 3 and 4B-4F, linear covariates x and y are shown in FIGS. 4B and 4C, squared covariates $x^2$ and $y^2$ are shown in FIGS. 4D and 4E, and a bilinear covariance xy is shown in FIG. 4F. During kernel regression 336, the steering kernel regression device 330 average pixels within each kernel based on these covariates. For example, the steering kernel regression device 330 can center these covariates on a target pixel, for example, locating the pixel at the center of the kernel at point (0,0) on the covariance graphs, and then weight all of the pixels within the kernel based on the height or value of the covariance. Each of these covariates can further be weighted by the image gradients 333 as shown above in Equation 1. The steering kernel regression device 330 can weight and average the pixel values within the kernels 402 according to the various covariates and image gradients 333 to generate output pixels for a jagged-edge corrected image 304.

Figure 5:
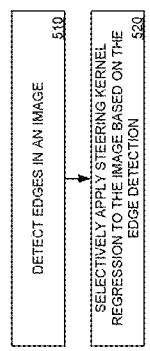
FIG. 5 is an example operational flowchart for jagged-edge correction utilizing selective steering kernel regression.

FIG. 5 is an example operational flowchart for jagged-edge correction utilizing selective steering kernel regression. Referring to FIG. 5, in a block 510, the image processing system 100 can detect edges in an image. In some embodiments, the image processing system 100 can detect edges with an edge detection device, such as a Canny edge detector, and then optionally dilates the detected edges, for example, by one or more pixels adjacent to the detected edges, to identify a dilated image region. Since not all edges in an image are jagged, in some embodiments, the image processing system 100 can include a matched bank filter to compare known jagged edge configurations to the image to determine whether the image or portions thereof include jagged edges.

In a block 520, the image processing system 100 can selectively apply steering kernel regression to the image based on the edge detection. The application of the steering kernel regression by the image processing system 100 can smooth the jagged edges identified by the image processing system 100.

In some embodiments, the image processing system 100 can apply steering kernel regression to those portions of the image that correspond to the detected edges, for example, the dilated image region, while leaving the other portions of the image unprocessed by the steering kernel regression. In other embodiments, the image processing system 100 can alter the kernel sizing based on the comparison of the image to the jagged edge configurations.

For example, the image processing system 100 can generate a composite score from the scores from the matched filter bank that correspond to a likeliness that a particular portion of the image includes a jagged edge, and then utilize the composite score to alter a kernel sizing for the particular portion of the image. For example, when the composite score indicates that a jagged edge is present in a first portion of the image, the image processing system 100 can enlarge the kernel to smooth the jagged edge based on the image data from surrounding pixels. When the composite score indicates that a jagged edge is not present in a second portion of the image, the image processing system 100 can shrink the kernel to reduce or eliminate averaging of the pixel with adjacent pixels in the image. In some embodiments, the image processing system 100 can generate the composite score by aggregating multiple scores from the matched filter bank or by selecting at least one of the score, such as a maximum score, from the multiple scores generated by the matched filter bank.

FIG. 6 is a block diagram another example of a jagged-edge correction device 600. Referring to FIG. 6, the jagged-edge correction device 600 can perform a rank-reduced second-order kernel regression on image data 602 to generate a jagged-edge corrected image 604.

The jagged-edge correction device 600 can include a polynomial regression element 610 to generate directional gradients 612 from the image data 602. The directional gradients 612 can correspond to a directional change of an intensity or color in the image represented by the image data 602. The polynomial regression element 610 can perform a polynomial regression on the image data 602 to determine the directional gradients 612, for example, based on Equation 1, which can include gradients $\alpha_{00}$, $\alpha_{10}$, and $\alpha_{01}$. In some embodiments, the polynomial regression element 610 can elect to not calculate gradients $\alpha_{20}$, $\alpha_{02}$, and $\alpha_{11}$ in Equation 1 or incorporate gradients $\alpha_{20}$, $\alpha_{02}$, and $\alpha_{11}$ into directional gradients 612.

The jagged-edge correction device 600 can include a covariance matrix calculator 620 to generate a structure matrix including a linear predictor 622 and a quadratic predictor 624 from the directional gradients 612. In some embodiments, the covariance matrix calculator 620 can generate the linear predictor 622 and the quadratic predictor 624 from a reduced-rank of the directional gradients 612, for example, gradients $\alpha_{00}$, $\alpha_{10}$, and $\alpha_{01}$, while not utilizing and/or calculating gradients, $\alpha_{20}$, $\alpha_{02}$, and $\alpha_{11}$. For example, the linear predictor 622 can have the form $(x\alpha_{10}+y\alpha_{01})$ and the quadratic predictor 624 can have the form $(x\alpha_{10}+y\alpha_{01})^2$.

Figure 7A:
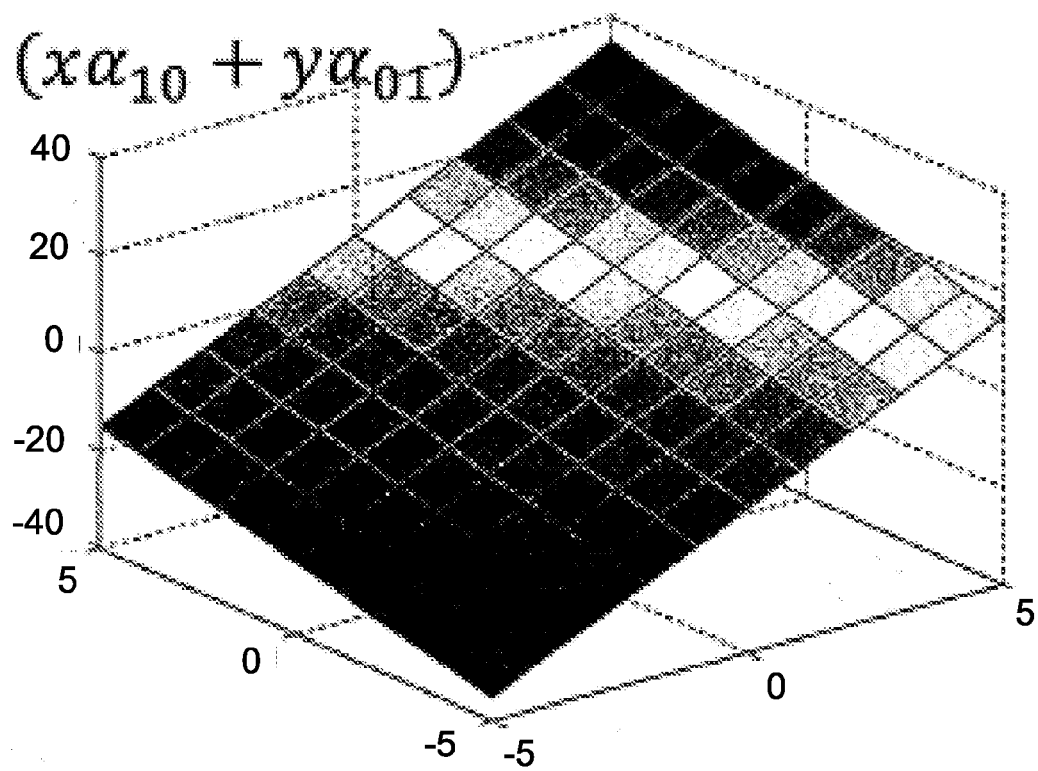
FIGS. 7A and 7B are graphs showing covariates utilized by the rank-reduced second-order kernel regression shown in FIG. 6.
Figure 7B:
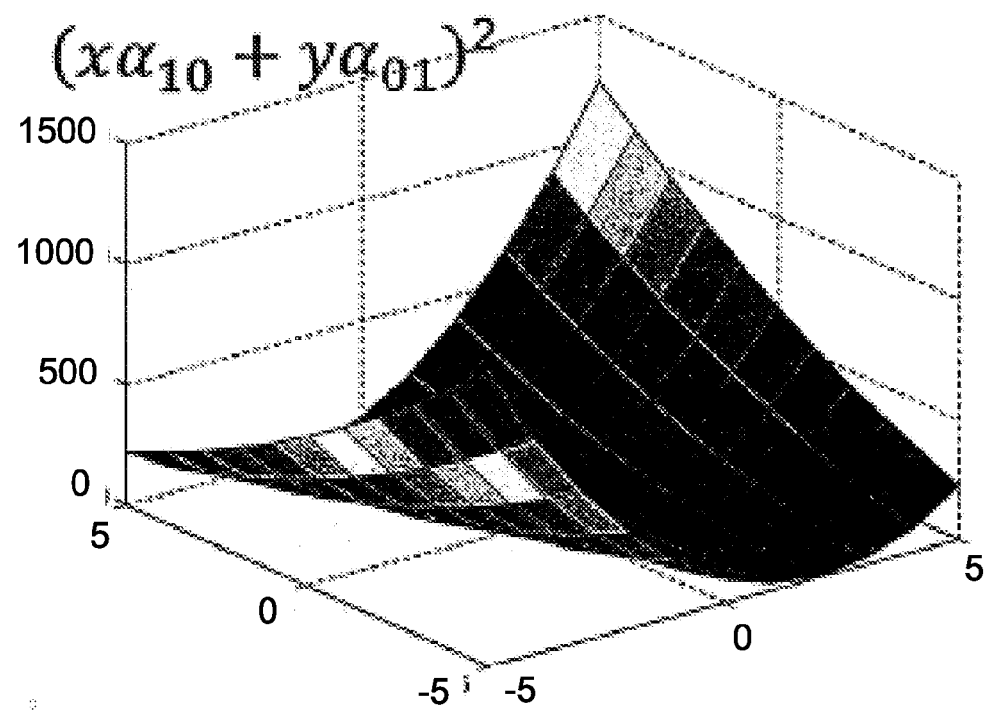

FIGS. 7A and 7B are graphs showing covariates utilized by the rank-reduced second-order kernel regression shown in FIG. 6. Referring to FIGS. 6 and 7A-7B, linear predictor 622 is shown in FIG. 7A and the quadratic predictor 624 is shown in FIG. 7B. During kernel regression, the jagged edge correction device 600 average pixels within each kernel based on the covariates corresponding to these predictors 622 and 624. For example, the jagged edge correction device 600 can center these covariates on a target pixel, for example, locating the pixel at the center of the kernel at point (0,0) on the covariance graphs, and then weight all of the pixels within the kernel based on the height of the covariates. Each of these covariates can further be weighted by the directional gradients 612 or other scalar values, as will be described below. The jagged edge correction device 600 can weight and average the pixel values within the kernels according to the various covariates to generate output pixels for a jagged-edge corrected image 604.

Referring back to FIG. 6, the covariance matrix calculator 620 can include the linear predictor 622 and the quadratic predictor 624 into Equation 2, which can define a rank-reduced second-order covariates for use in kernel regression.

$$f(x_0+x, y_0+y) = \\ \alpha_{00} + (x\alpha_{10} + y\alpha_{01})\beta_1 + (x\alpha_{10} + y\alpha_{01})^2\beta_2 + e = \\ \alpha_{00} + x\alpha_{10}\beta_1 + y\alpha_{01}\beta_1 + x^2\alpha_{10}^2\beta_2 + \\ y^2\alpha_{01}^2\beta_2 + 2xy\alpha_{01}\alpha_{10}\beta_2 + e$$

Equation 2

The function corresponds to a two-dimensional, x-direction and y-direction, rank-reduced second-order regression, where x and y correspond to a point on the image. $\alpha_{00}$ can be a directional gradient 612 corresponding to $f(x_0, y_0)$, $\alpha_{10}$ can be a directional gradient 612 corresponding to $f_x$, and $\alpha_{01}$ can be a directional gradient 612 corresponding to $f_y$. The function can include covariates x, y, xy, $x^2$, and $y^2$, the values $\beta_1$ and $\beta_2$ can be scalar values, and the value e can be an error value. By reducing the rank of the directional gradients 612 to include $\alpha_{00}$, $\alpha_{10}$, and $\alpha_{01}$, while not including gradients, $\alpha_{20}$, $\alpha_{02}$, and $\alpha_{11}$ as in the second order polynomial regression described in Equation 1, the covariates derived from Equation 2 can reduce isophote curvature between pixels in the image, while maintaining second-order variation across isophote curves to allow the rank-reduced second-order kernel regression to smooth jagged edges.

Isophote curvature can indicate a magnitude of a deviation from a straight line between points on an image, which can be modeled by Equation 3.

$$K = \frac{f_x^2 f_{yy} + f_y^2 f_{xx} - 2f_x f_y f_{xy}}{|f_x^2 + f_y^2|^3}$$

Equation 3

In Equation 3, the value of K can indicate a size of a region or neighborhood in an image for the isophote curvature. By modifying the predictors in a rank-reduced second-order regression, as discussed above in Equation 2, the rank-reduced second-order regression can force the value of K to (or towards) zero. For example, terms in Equations 1 and 2 can be matched based on the covariates x, y, $x^2$, $y^2$, and xy, such that the function $f_x$ can correspond to $\alpha_{10}\beta_1$, $f_y$ can correspond to $\alpha_{01}\beta_1$, $f_{xy}$ can correspond to $2\alpha_{01}\alpha_{10}\beta_2$, $f_{xx}$ can correspond to $2\alpha_{10}^2\beta_2$, and $f_{yy}$ can correspond to $2\alpha_{01}^2\beta_2$. By substituting the matched values into Equation 3, the numerator becomes zero, which can force K to become zero reducing isophote curvature, while maintaining second-order variation in the rank-reduced second-order regression.

The covariance matrix calculator 620 can generate the structure matrix according to Equation 4.

$$S = \begin{bmatrix} E\{f_x^2\} & E\{f_x f_y\} \\ E\{f_x f_y\} & E\{f_y^2\} \end{bmatrix}$$

Equation 4

The structure matrix S can include the linear predictor 622, the quadratic predictor 624, and pixel variances 626. The covariance matrix calculator 620 can provide the structure matrix to the kernel regression device 640, for example, allowing the kernel regression device 640 to perform a rank-reduced second-order kernel regression operation on image data 602 within kernels according to Equation 2.

The covariance matrix calculator 620 also can provide the pixel variances 626 to a coherence value generation device 630. In some embodiments, the coherence value generation device 630 can decompose the pixel variances 626 from the structure matrix, for example, by performing an eigenvalue decomposition of a structure matrix S represented by Equation 4.

$$S = \lambda_1 uu^T + \lambda_2 vv^T \qquad \text{Equation 5}$$

The value u can correspond to a direction of maximum pixel variance and the value $\lambda_1$ can be a scalar value corresponding to a magnitude of the variance in the direction specified by u. The value v can correspond to a direction orthogonal to the direction specified by u and the value $\lambda_2$ can be a scalar value corresponding to a magnitude of the variance in the direction specified by v. The coherence value generation device 630 can utilize the values $\lambda_1$ and $\lambda_2$, for example, the pixel variances 626, as shown in Equations 6 and 7 to generate a kernel variance value 632.

$$c(\lambda_1, \lambda_2) = \left(\frac{\lambda_1 - \lambda_2}{\lambda_1 + \lambda_2}\right)^2 \qquad \text{Equation 6}$$

The function $c(\lambda_1, \lambda_2)$ can correspond to a coherence of localities in the image and, for example, can measure a uniformity of local variations in the image.

$$\sigma^2 = \lambda_1 c(\lambda_1, \lambda_2) \qquad \text{Equation 7}$$

The value $\sigma^2$ can be the kernel variance value 632, which correspond to the measure of the uniformity of local variations in the image multiplied by the magnitude of the maximum variance $\lambda_1$. In some embodiments, the coherence value generation device 630 can set an upper threshold level for $\lambda_1$, for example, to $10\sigma^2$, and set a lower threshold level for $\lambda_2$, for example, to $\sigma^2$, which can help to stabilize the kernel variance value 632 and subsequent kernel sizing in the kernel regression device 640. The kernel regression device 640 can utilize the kernel variance value 632 to alter a size and/or shape of the kernels for the kernel regression. For example, Equation 8 shows a representation of the kernel generated by the kernel regression device 640.

$$K(x-x_0, y-y_0) = w \cdot \exp\left(-\frac{[x-x_0 \quad y-y_0] \sum_{x_0 y_0}^{-1} \begin{bmatrix} x-x_0 \\ y-y_0 \end{bmatrix}}{2\sigma_{x_0 y_0}^2}\right) \qquad \text{Equation 8}$$

The kernel regression device 640 can substitute the kernel variance value 632 for the value $\sigma_{x_0 y_0}^2$, which can allow the kernel to stretch or expand when the image shows high contrast and a straight line, or contract when the image indicates the presence of a junction, corner, or texture in the image. Thus, kernel regression device 640 can adjust the kernel size and/or shape based on whether the content of the image shows the presence of a jagged edge as opposed to a junction, corner, or texture.

In some embodiments, the coherence value generation device 630 can indicate to the kernel regression device 640 to not adjust the size of the kernel. For example, when the value $\lambda_2$ is greater than the kernel variance value 632, the coherence value generation device 630 can signal the kernel regression device 640 to not adjust the size of the kernel, as the adjustment may provide little to no ability to help the kernel regression smooth the image along isophotes.

The jagged-edge correction device 600 can perform each of these stages—identification of the directional gradients 612, generation of a structure matrix that includes the linear predictor 622, quadratic predictor 624, and the pixel variances 626, and performance of the rank-reduced second-order regression—on a per pixel basis. In some embodiments, the jagged-edge correction device 600 compute the across an image frame or portion thereof first and then perform the rank-reduced second-order kernel regression. For example, the jagged-edge correction device 600 can compute gradient planes $f_x$ and $f_y$ for the image frame or portion thereof. The jagged-edge correction device 600 can generate planes $f_x^2$, $f_y^2$, and $f_{xy}$ from the gradient planes $f_x$ and $f_y$, and convolve the planes $f_x^2$, $f_y^2$, and $f_{xy}$ with a Gaussian kernel to generate a structure matrix including the linear predictor 622 and quadratic predictor 624 for each pixel in the image frame or portion thereof. The jagged-edge correction device 600 can compute planes $\lambda_1$, $\lambda_2$, $u_1$, $u_2$, and $\sigma^2$ from the structure matrix for each pixel in the image frame or portion thereof. The jagged-edge correction device 600 can perform the rank-reduced second-order kernel regression for the image frame based on the structure matrix and the planes $\lambda_1$, $\lambda_2$, $u_1$, $u_2$, and $\sigma^2$. By performing these operations on a per frame basis, the speed at which the rank-reduced second-order kernel regression can be increased.

Figure 8:
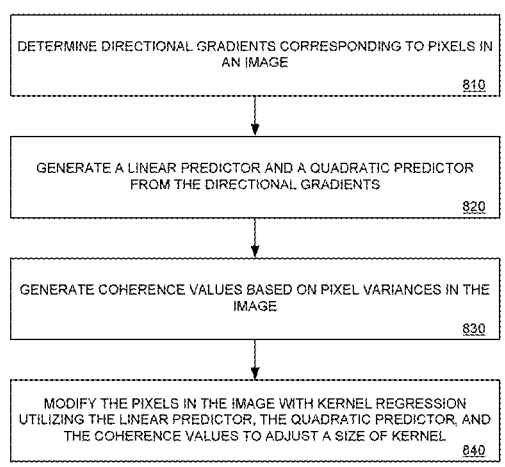
FIG. 8 is an example operational flowchart for jagged-edge correction utilizing the rank-reduced second-order kernel regression shown in FIG. 6.

FIG. 8 is an example operational flowchart for jagged-edge correction utilizing the rank-reduced second-order kernel regression shown in FIG. 6. Referring to FIG. 8, in a block 810, an image processing system can determine directional gradients 612 corresponding to pixels in an image. In some embodiments, the directional gradients 612 can correspond to a reduced rank of gradients, such as $\alpha_{00}$, $\alpha_{10}$, and $\alpha_{01}$, as compared to the image gradients determined from a two-dimensional polynomial regression. These directional gradients can be determined on a pixel-by-pixel basis, or as gradient planes across multiple pixels, such as an image frame.

In a block 820, the image processing system can generate a linear predictor 622 and a quadratic predictor 624 from the directional gradients 612. In some examples, the linear predictor 622 can have the form $(x\alpha_{10} + y\alpha_{01})$ and the quadratic predictor 624 can have the form $(x\alpha_{10} + y\alpha_{01})^2$. In some embodiments, the image processing system can generate a structure matrix for each pixel in the image and the structure matrix can include the linear predictor 622 and the quadratic predictor 624. This generation of a structure matrix for each pixel can be performed individually or by convolving the gradient planes with a Gaussian kernel.

In a block 830, the image processing system can generate coherence values based on pixel variances in the image. In some embodiments, the image processing system can decompose the structure matrix, for example, through eigenvalue decomposition, to determine various values, such as $\lambda_1$ and $\lambda_2$, and then compute a coherence value from $\lambda_1$ and $\lambda_2$. In some embodiments, the image processing system can compute a kernel variance value $\sigma^2$ from the coherence value.

In a block 840, the image processing system can modify the pixels in the image with kernel regression utilizing the linear predictor, the quadratic predictor, and the coherence values. The image processing system can utilize the linear predictor and the quadratic predictor to determine the regressive weightings to provide pixels within the kernels and then average the pixels in the kernels based on the regressive weightings. The image processing system can utilize the coherence values to adjust sizes of the kernels for the pixels based on the content of the image, for example, to stretch along high-contrast straight edges and to shrink at corners, junctions, and textured areas.

The system and apparatus described above may use dedicated processor systems, micro controllers, programmable logic devices, microprocessors, or any combination thereof, to perform some or all of the operations described herein. Some of the operations described above may be implemented in software and other operations may be implemented in hardware. Any of the operations, processes, and/or methods described herein may be performed by an apparatus, a device, and/or a system substantially similar to those as described herein and with reference to the illustrated figures.

The processing device may execute instructions or "code" stored in memory. The memory may store data as well. The processing device may include, but may not be limited to, an analog processor, a digital processor, a microprocessor, a multi-core processor, a processor array, a network processor, or the like. The processing device may be part of an integrated control system or system manager, or may be provided as a portable electronic device configured to interface with a networked system either locally or remotely via wireless transmission.

The processor memory may be integrated together with the processing device, for example RAM or FLASH memory disposed within an integrated circuit microprocessor or the like. In other examples, the memory may comprise an independent device, such as an external disk drive, a storage array, a portable FLASH key fob, or the like. The memory and processing device may be operatively coupled together, or in communication with each other, for example by an I/O port, a network connection, or the like, and the processing device may read a file stored on the memory. Associated memory may be "read only" by design (ROM) by virtue of permission settings, or not. Other examples of memory may include, but may not be limited to, WORM, EPROM, EEPROM, FLASH, or the like, which may be implemented in solid state semiconductor devices. Other memories may comprise moving parts, such as a known rotating disk drive. All such memories may be "machine-readable" and may be readable by a processing device.

Operating instructions or commands may be implemented or embodied in tangible forms of stored computer software (also known as "computer program" or "code"). Programs, or code, may be stored in a digital memory and may be read by the processing device. "Computer-readable storage medium" (or alternatively, "machine-readable storage medium") may include all of the foregoing types of memory, as well as new technologies of the future, as long as the memory may be capable of storing digital information in the nature of a computer program or other data, at least temporarily, and as long at the stored information may be "read" by an appropriate processing device. The term "computer-readable" may not be limited to the historical usage of "computer" to imply a complete mainframe, mini-computer, desktop or even laptop computer. Rather, "computer-readable" may comprise storage medium that may be readable by a processor, a processing device, or any computing system. Such media may be any available media that may be locally and/or remotely accessible by a computer or a processor, and may include volatile and non-volatile media, and removable and non-removable media, or any combination thereof.

A program stored in a computer-readable storage medium may comprise a computer program product. For example, a storage medium may be used as a convenient means to store or transport a computer program. For the sake of convenience, the operations may be described as various interconnected or coupled functional blocks or diagrams. However, there may be cases where these functional blocks or diagrams may be equivalently aggregated into a single logic device, program or operation with unclear boundaries.

One of skill in the art will recognize that the concepts taught herein can be tailored to a particular application in many other ways. In particular, those skilled in the art will recognize that the illustrated examples are but one of many alternative implementations that will become apparent upon reading this disclosure.

Although the specification may refer to "an", "one", "another", or "some" example(s) in several locations, this does not necessarily mean that each such reference is to the same example(s), or that the feature only applies to a single example.

The invention claimed is:

1. A computer-implemented method comprising:
   detecting edges in an image, including portions of the image that correspond to a jagged edge configuration;
   selectively applying kernel regression to portions of the image that correspond to the jagged edge configuration; and
   outputting a corrected image.

2. The computer-implemented method of claim 1, wherein selectively applying kernel regression to portions of the image further comprises:
   dilating the detected edges of the image to include portions of the image adjacent to the detected edges in a dilated image region; and
   selectively applying kernel regression to the portions of the image within the dilated image region.

3. The computer-implemented method of claim 1, wherein detecting edges in the image further comprises comparing the image to jagged edge configurations.

4. The computer-implemented method of claim 3, wherein the comparing of the image to jagged edge configurations is performed by a matched filter bank loaded with the jagged edge configurations.

5. The computer-implemented method of claim 3, wherein selectively applying kernel regression further comprises adjusting a size of kernels utilized in the kernel regression based on the comparison of the image to jagged edge configurations.

6. A computer-implemented method comprising:
   detecting an edge in an image;
   dilating the detected edge of the image to include portions of the image adjacent to the detected edge in a dilated image region;
   selectively applying kernel regression to detecting edges in an image, including portions of the image that correspond to a jagged edge configuration;
   selectively applying kernel regression to portions of the image that correspond to the jagged edge configuration; and
   outputting a corrected image.

7. The computer-implemented method of claim 6, wherein dilating the detected edges of the image includes dilating the edges by more than one pixel in at least one direction around the detected edges.

8. The computer-implemented method of claim 6, wherein detecting the edge in the image employs Canny edge detection.

9. The computer-implemented method of claim 6, wherein selectively applying kernel regression to the portions of the image within the dilated image region includes applying kernel regression to the detected edge and not applying kernel regression to other portions of the image.

10. A computer-implemented method comprising:
   detecting an edge in an image, including comparing the image to plural jagged edge configurations;
   selectively applying kernel regression to portions of the image based, at least in part, on the detection of the edge in the image corresponding to the jagged edge configurations; and
   outputting a corrected image.

11. The computer-implemented method of claim 10, wherein selectively applying kernel regression further comprises applying kernel regression to the portions of the image corresponding the jagged edge configurations.

12. The computer-implemented method of claim 10, wherein the comparing of the image to plural jagged edge configurations includes determining a score of a degree of match to each of the plural jagged edge configurations.

13. The computer-implemented method of claim 12, further including determining a composite score for jaggedness in the image by selecting a maximum score out of the scores of the degree of match to the plural jagged edge configurations.

14. The computer-implemented method of claim 12, further including determining a composite score for jaggedness in the image by aggregating the scores of the degree of match to the plural jagged edge configurations.

15. The computer-implemented method of claim 10, wherein selectively applying kernel regression further comprises adjusting a size of kernels utilized in the kernel regression based on the comparison of the image to jagged edge configurations.

* * * * *